2,894,970
Patented July 14, 1959

2,894,970

ESTER-TYPE WAX OXIDATE OF MACROCRYSTALLINE WAX AND PROCESS FOR PRODUCING SAME

John K. McKinley, Hopewell Junction, N.Y., and Roy F. Nelson and Gordon S. Bright, Port Arthur, Tex., assignors to The Texas Company, New York, N.Y., a corporation of Delaware No Drawing. Application January 30, 1958
Serial No. 712,073

7 Claims. (Cl. 260—451)

This invention relates to high ester content wax oxidates and process for producing same. The wax oxidates produced by the process of this invention are useful in hydrocarbon fractions as anticorrosive agents. They find particular use in specialty lubricating oils, gasoline, diesel oils, jet fuels and furnace oils. This application is a continuation-in-part of our patent application Serial No. 427,653, filed on May 4, 1954, now abandoned, and having the same title.

Oxidation of high molecular weight hydrocarbons with air or oxygen results in the production of a heterogeneous mixture of oxygenated compounds. Not only are many different types of oxygenated hydrocarbons produced, but oxygenates of a wide molecular weight range result because the oxidation is accompanied by substantial chain degradation even when a relatively close boiling charge material is employed. The complexity of the oxidation product is apparent from a brief review of the types of oxygenates obtained. Acids, alcohols, aldehydes and ketones are all produced directly in the oxidation reaction. At the oxidation temperatures ordinarily employed, which are usually in the range of 200 to 450° F., a number of secondary reaction products are formed; in particular, there is a substantial amount of thermal esterification of organic acids with hydroxy acids and with alcoholic components of the reaction mixture.

Despite the extensive nature of the prior art on wax oxidation, the technical literature and the patent art are deficient in teaching how to control the oxidation of a deoiled paraffin wax to produce an oxidate characterized by high ester content, low unsaponifiable content and good mineral oil solubility. The wax oxidates of this invention possess these properties and, as a consequence, are excellent anticorrosive additives for hydrocarbon fractions.

In accordance with the process of this invention, high ester content wax oxidates of low unsaponifiable content and good mineral oil solubility are obtained by reacting a deoiled paraffin wax containing less than 5 percent oil with air in the presence of a catalyst at an air velocity of 1.5 to 6 feet per second, corresponding to an air rate of about 4 to about 38 cubic feet per pound of wax per hour for the equipment we have used, at a temperature between 300 and 350° F. and at a pressure below 25 p.s.i.a. The critical features in obtaining an ester-type wax oxidate of the prescribed characteristics are charge material, maintenance of prescribed pressure and temperature conditions, and use of an air velocity in the prescribed range. The wax oxidates obtained by the use of the prescribed processing conditions in a period of 1 to 10 hours are characterized by a neut. number above 60 and usually between 70 and 100, a sap. number above 170 and usually between 175 and 300, a neut. number to sap. number ratio between 0.25 and 0.5, and unsaponifiable content less than 40 percent.

The deoiled paraffin wax prescribed as a charge material in this invention is macrocrystalline in character and is derived from lubricating oil distillates. Paraffin wax, which is predominantly aliphatic in nature, normally contains between 20 and 33 carbon atoms per molecule. The preferred paraffin wax for use in this invention contains an average of 25 to 30 carbon atoms per molecule. Deoiled paraffin waxes meeting the specification of less than 5 percent oil are available as by-products of the manufacture of low pour lubricating oils. The deoiled wax is obtained from distillate lubricating oil fractions by solvent dewaxing or by pressing and sweating, and usually contains less than 3 percent oil. A preferred charge material for the process of the invention is obtained by solvent dewaxing a distillate oil which has been solvent refined with a solvent such as furfural, phenol, etc. A wax of 125 to 127° F. melting point obtained by solvent dewaxing a lube oil distillate is an example of a preferred charge material.

The importance of the charge material in determining the characteristics of the resulting oxidate is demonstrated by comparison of properties of the oxidates obtained under similar reaction conditions by oxidation of a semi-refined 125 to 127° F. melting point paraffin wax isolated from a waxy paraffin distillate by solvent dewaxing and of a petrolatum having a 151.8° F. melting point and isolated from a refined residuum by centrifuge dewaxing. In Table I, there are shown the properties of the oxidates obtained from the afore-described petrolatum and paraffin wax in 6 and 4 hours, respectively, by air oxidation at a temperature of 330° F., at atmospheric pressure, at an air velocity of 3 feet per second, equivalent to an air rate of 20 cubic feet per pound per hour, and with 0.4 weight percent KMnO₄ as a catalyst; the oxidation was effected in the pilot unit.

TABLE I

|  | Petrolatum Oxidate | Paraffin Wax Oxidate |
|---|---|---|
| Yield, percent | 90 | 71 |
| Neut. No | 29 | 85 |
| Sap. No | 122 | 235 |
| Neut. No./Sap. No. ratio | 0.24 | 0.36 |
| Unsaponifiable content, percent | 32 | 33 |
| SUS Viscosity at 210° F | 7,000 | 100 |
| Naphtha insoluble, percent | 2 | 5 |

The different properties, particularly neut. nos., sap. nos. and SUS viscosities, of the petrolatum oxidate and the paraffin wax oxidate are striking. The paraffin wax oxidate of this invention has S.U.S. viscosity at 210° F. which is below about 900 and ordinarily is in the range of about 100 to about 700.

Our invention has two aspects. Using the foregoing conditions a product having superior oil solubility can be made in conventional oxidation equipment, i.e., an aluminum-lined or stainless steel reactor, in the presence of metalliferous oxidation catalyst dispersed in the reaction mixture. On the other hand, the operation can be done in such reactor and in the absence of any such added catalyst whereby, uniquely, the reaction time is shorter for obtaining products of the same neut. number (with the advantage of higher yield) but the hydrocarbon oil solubility of the resulting product is somewhat less. A particularly preferred catalyst in the catalytic aspect of our invention is potassium permanganate which is charged to the reactor in an aqueous solution together with deoiled paraffin wax. A potassium permanganate catalyst of this nature is employed in amounts ranging from 0.1 to 1.0 percent of the total hydrocarbon charge; 3 to 10 percent aqueous solutions of potassium permanganate are ordinarily used to introduce the required catalyst into the reaction zone. Excellent distribution of the potassium permanganate throughout the wax is obtained during the induction period during which air is blown through the reaction mixture as it is raised to the specified temperature range. The water evaporates during the induction period, leaving the catalyst distributed throughout the wax charge very uniformly. Although potassium permanganate in the form of an aqueous solution is the preferred oxidation catalyst, oil-soluble catalysts such as manganese stearate, zinc stearate and manganese and zinc salts of previously oxidized wax fractions may also be employed in the process of this invention to produce the desired ester-type, oil-soluble oxidates of low unsaponifiable content.

In that aspect of our operation wherein no added catalyst is used, it is conceivable that metallic reactor walls, though clean, can exert some catalytic effect. For practical purposes, however, such catalytic effect, if any, would be expected to be infinitesimal as compared to the catalytic effect of introducing dispersed metalliferous oxidation catalyst into the reaction mixture as hereinbefore described. Thus, for the purpose of this specification, the term "in the absence of added metalliferous oxidation catalyst" should be construed as being exclusive of possible incidental catalytic effect of the confining metallic reactor surfaces and should be understood to mean the omission of deliberately added metalliferous oxidation catalyst to the reaction mixture. Similarly, the term "in the presence of a metalliferous oxidation catalyst" should be understood to mean the deliberate addition of such catalyst into the reaction mixture, e.g., by the hereinbefore-described dispersing techniques.

The oxidation temperature must be maintained between 300 and 350° F. in order to produce an oxidate of desired characteristics. When the temperature is in the prescribed 300 to 350° F. range and the other reaction conditions are observed, the neut. nos. of the product either slightly decrease or substantially level out as reaction times increase from 4 to 10 hours, while the sap. nos. steadily increase until they reach a maximum in the neighborhood of 10 to 13 hours. The effect of higher temperatures on the properties of oxidates from deoiled paraffin wax, while maintaining the other prescribed conditions, is particularly surprising. Temperatures in the range of 350 to 400° F. produce a paraffin wax oxidate whose neut. nos. are much lower and whose sap. nos. are substantially lower than the product obtained at the 300 to 350° F. range. In addition, the oxidate obtained at the higher temperature range has a higher unsaponifiable content and a much lower neut. no. to sap. no. ratio. When oxidation is effected at the 350 to 400° F. range, the neut. nos. reach a low maximum value, then progressively decrease with reaction time. Temperatures below 300° F. give an oxidate of higher unsaponifiable content, poorer solubility and greater acidity. The critical nature of the 300 to 350° F. temperature range is shown in the subsequent examples.

Control of reaction temperature is ordinarily effected by indirect heat exchange. An alternate means of temperature control involves continuous introduction of water which effects removal of exothermic heat from the reaction zone by evaporative cooling.

Pressure below 25 p.s.i.a. and preferably atmospheric pressures are prescribed in order to produce the high ester content oil-soluble oxidate of the invention. Pressures above the prescribed 25 p.s.i.a. limit result in the production of more acidic oxidates with neut. no. to sap. no. ratios of about 0.6.

The final decisive factor in the production of the desired oxidates is the rate at which air is passed through the deoiled paraffin wax. Air velocities of approximately 1.5 to 6 feet per second must be employed in order to obtain the desired ester-type, oil-soluble oxidate of low unsaponifiable content. Comparison of the results obtained on the pilot laboratory unit holding 150 pounds of charge wax and on the plant unit holding about 3,000 pounds of charge wax indicates that the air velocity in feet per second is the most decisive factor in obtaining equivalent results on the pilot and plant units.

In this application the volumetric rate of air feed per pound of wax referred to is computed at the standard conditions of 60° F. and 760 mm. Hg total pressure. The air velocity referred to in this case is a superficial velocity computed as the quotient of cubic feet of air per second flowing through the reactor at operating temperature divided by the square feet of reactor cross-section empty of any charge.

In the pilot unit operation at 330° F. the prescribed 1.5 to 6 feet per second superficial air velocity is obtained by using an air rate of about 9 to 36 cubic feet per pound of wax initially charged per hour at a wax loading of 150 pounds, while in the plant unit the required air velocity at this temperature is obtained by using air rates of about 4.5 to 18 cubic feet per pound of wax charge per hour at a wax loading of 3000 pounds. Broadly, in our experience from both pilot and plant operation, the air rates needed to obtain the critical superficial velocity at a temperature in the prescribed range of 300 to 350° F. fall in the range of about 4 to about 38 cubic feet per pound of wax per hour, the commercial unit air rate usually being roughly half that used in our pilot plant, said commercial reactor having a higher slenderness ($L/D$) ratio than that of said pilot unit reactor. The superficial air velocity required for the production of the desired ester-type oxidates is in the same range for both pilot and commercial unit operation.

At air velocities above the prescribed range, even though the other reaction conditions are observed, yield of the oxidate product from the operation can be substantially impaired, and excessive entrainment of liquid particles in the overhead vapors is encountered. At air velocities below the prescribed ranges, the unsaponifiable content is very high, generally above 50 percent, and both the neut. nos. and sap. nos. are low and increase with reaction time. The neut nos. increase from about 14 to about 36 at reaction times between 4 and 13 hours, while the sap. nos. increase from about 50 to 135 as the oxidation time varies over the same period. Apparently, the use of air velocities and air rates in the prescribed ranges in conjunction with the use of prescribed temperature and pressure conditions effects the proper correlation of agitation and contact of the reactants to produce a high ester-type, oil-soluble oxidate from a deoiled paraffin wax. It is important to note that in both pilot and plant operation in the amount of air passed through the reaction mixture is considerably in excess of that which reacts with the deoiled paraffin wax.

The desired oxidate which imparts excellent corrosion resistance to lubricants and other hydrocarbon fractions is produced in a period of about 4 to 10 hours by the catalytic process of this invention. When the reaction temperature, pressure and air velocity are in the upper portion of the prescribed ranges, the desired product is obtained in a period within the lower portion of the prescribed 4- to 10-hour range, whereas when lower temperatures, pressures and air rates within the prescribed ranges are employed, a longer reaction period is required. When the oxidation is effected at an air velocity of about 3 feet per second, a temperature of about 330° F. and atmospheric pressure, an oxidate having a sap. no. of about 200 to 270, a neut. no. in the range of 70 to 90 and an unsaponifiable content of about 25 to 40 percent is obtained in about 4 to 6 hours.

When the non-catalytic embodiment of our invention is employed, that is, wherein the wax charge is made up without the addition of metalliferous oxidation catalyst, the reaction time is generally much shorter, that is, between 1 and 4 hours and, more generally, about 2 to 3 hours. The reaction product is somewhat less soluble in hydrocarbon fractions, e.g., the insolubility rises from a value of 0.1–5% for the product of our catalytic operation to one as high as 10–15% for the product of our non-catalytic operation. Dilution of the product oxidate with a hydrocarbon distillate, followed by settling of hydrocarbon-insoluble material and separation thereof as, for example, by filtration, is a suitable way for separating the hydrocarbon oil-insoluble fraction of our ester-type wax oxidates.

The process of the invention is illustrated in detail in the following examples showing oxidation of deoiled paraffin wax at the prescribed reaction conditions of this invention and at conditions outside the specified ranges. The critical nature of the reaction conditions to the production of a high ester-type, oil-soluble wax oxidate of low unsaponifiable content is clearly demonstrated in these examples.

*Example I*

There was charged to a 12-foot high aluminum pilot reactor having an internal diameter of 10 inches and provided with heat exchange surface 150 pounds of a deoiled paraffin wax obtained by solvent dewaxing a lubricatig oil distillate of SAE 20 grade. The charge wax had the following properties:

| | |
|---|---|
| Gravity, ° API | 43.6 |
| Flash, O. Cleve., ° F. | 410 |
| Visc., Say. Univ., at 210 ° F. | 38 |
| English melting point, ° F. | 126 |
| Ash | none |
| Oil, percent (ASTM) | about 0.7 |
| Petrolatum melting point, ° F. | 124.5 |
| Fire, Cleve., ° F. | 470 |

There was also charged to the reactor an aqueous solution of potassium permanganate prepared by dissolving 0.6 pound of potassium permanganate in 10 pounds of water, giving a catalyst concentration of 0.4 percent. The reaction mixture was rapidly heated to a temperature of about 350° F. and then was maintained at a temperature of about 330° F. and at atmospheric pressure. Air was passed through the mixture at an air velocity of about 5.0 feet per second, equivalent to an air rate of about 30 cubic feet of air per pound of paraffin wax per hour in the pilot unit. The reaction was continued for a period of about 7 hours to give an oxidate having the following characteristics:

| | |
|---|---|
| Neut. no. | 82 |
| Sap. no. | 279 |
| Ratio, neut. no./sap. no. | 0.30 |
| Unsap., percent | 34.6 |
| Gravity, ° API | 13.6 |
| Flash, O. Cleve., ° F. | 420 |
| Fire, Cleve., ° F. | 465 |
| Visc., Say. Univ., at 210° F. | 268 |
| Petrolatum melting point, ° F. | 106⅔ |
| Ash, percent | 1.01 |
| Hrs. oxidation | 7 |

The same charge material was oxidized under the same reaction conditions with the exception that the oxidation was continued for 10 to 13 hours. The oxidates obtained after 10 and 13 hours had the following properties:

| | Hours of Oxidation | |
|---|---|---|
| | 10 | 13 |
| Neut. No | 74 | 72.2 |
| Sap. No | 262 | 263 |
| Ratio, Neut. No./Sap. No | 0.28 | 0.27 |
| Unsap., Percent | 27.6 | 21.3 |
| Gravity, °API | 12.8 | 11.5 |
| Flash, O. Cleve., °F | 425 | |
| Fire, Cleve., °F | | |
| Visc., Say. Univ., at 210° F | 686 | 887 |
| Petrolatum Melting Point, °F | 109.5 | 113.6 |
| Ash, Percent | 0.85 | |

*Example II*

150 pounds of the same paraffin wax was charged to the same aluminum reactor with a similar concentration of aqueous potassium permanganate. The reaction mixture was immediately heated to a temperature of about 350° F. and thereafter maintained at a temperature of 330° F. and at atmospheric pressure. The air was passed through the wax at an air velocity of 0.9 foot per second, equivalent to an air rate of 5 cubic feet of air per pound of paraffin wax per hour. The properties of the oxidates obtained after 4, 7, 10 and 13 hours of oxidation are shown below:

| | Hours of Oxidation | | | |
|---|---|---|---|---|
| | 4 | 7 | 10 | 13 |
| Neut. No | 14 | 21.6 | 28.7 | 36.2 |
| Sap. No | 44 | 74.6 | 109 | 136 |
| Ratio, Neut. No./Sap. No | 0.318 | 0.29 | 0.263 | 0.266 |
| Unsap., Percent | 84.3 | 70.3 | 59.5 | 51.9 |
| Gravity, °API | 36.7 | 31.6 | 24.8 | 26.6 |
| Flash, O. Cleve., °F | 380 | 365 | 385 | 390 |
| Fire, Cleve., °F | 440 | 435 | 445 | 445 |
| Visc., Say. Univ., at 210° F | 41.9 | 48.3 | 57.9 | 75.3 |
| Petrolatum Melting Point, °F | | 118 | 113.2 | 114.2 |
| Ash, Percent | 0.43 | 0.32 | 0.43 | 0.45 |

Comparison of Examples I and II indicates that reduction of the air velocity below the specified minimum of 1.5 feet per second gives an ester-type product with a very high unsaponifiable content compared with the unsaponifiable contents of the oxidates prepared employing an air velocity within the prescribed range. In Example I, the oxidates from 7- and 10-hour reaction periods had unsaponifiable contents of 34.6 percent and 27.6 percent, respectively, whereas the oxidates obtained by 7 and 10 hours of reaction at similar reaction conditions with the exception of an air velocity below the prescribed minimum in Example II had unsaponifiable contents of 70.3 and 59.5. In Example II, the neut. nos. and sap. nos. of the oxidates increased with reaction, whereas in Example I the neut. nos. slightly decreased and the sap. nos. remained fairly constant.

*Example III*

150 pounds of the same paraffin wax employed in Example I was charged to the same aluminum reactor with an equivalent amount of aqueous permanganate. Air blowing was initiated and the temperature was raised to about 380° F. and then maintained at a temperature between 350 and 370° F. with atmospheric pressure. Air was passed through the paraffin wax at an air velocity of 5.0 feet per second, equivalent to an air rate of 30 cubic feet per pound of wax per hour. The properties of the oxidates obtained after 4, 7, and 8.6 hours of oxidation are as follows:

| | Hours of Oxidation | | |
|---|---|---|---|
| | 4 | 7 | 8.6 |
| Neut. No | 38.5 | 12.7 | 7.4 |
| Sap. No | 177 | 183 | 183 |
| Ratio, Neut. No./Sap. No | 0.217 | 0.08 | 0.0404 |
| Unsap., Percent | 45.4 | 46.8 | 45.5 |
| Gravity, °API | | | |
| Flash, O. Cleve., °F | 425 | 440 | |
| Fire, Cleve., °F | 475 | 485 | |
| Visc., Say. Univ., at 210° F | 685 | 30,745 | Too heavy |
| Petrolatum Melting Point, °F | 117 | 117.2 | 134.8 |
| Ash, Percent | 0.64 | | 0.740 |

Comparison of the oxidates of Example III with the oxidates of Example I indicates the surprising fact that oxidation of higher temperature conditions results in a product having a higher unsaponifiable content, lower neut, and sap. nos. and very low neut. no. to sap. no. ratios. The only difference in reaction conditions between Examples I and III is the temperature employed, with a 330° F. oxidation temperature being employed in Examples I and II and a 350 to 370° F. temperature range being employed in Example III. The oxidates obtained at the lower temperature in Example I have neut. nos. in the neighborhood of 75 to 80, sap. nos.

in the range of 270 and 282 and unsaponifiable contents in the neighborhood of 30 to 35 percent, whereas the oxidates obtained at a higher temperature in Example III have neut. nos. below 40 and usually about 10, sap. nos. of about 180 and unsaponifiable contents in the neighborhood of 45 percent. The neut. no. to sap. no. ratios of 0.08 and 0.04 at oxidation times of 7 and 8.6 hours, respectively, are particularly significant.

*Example IV*

3,000 pounds of the same paraffin wax employed in Example I was charged to an aluminum-lined plant-sized reactor having an internal diameter of 2.5 feet, a height of 22 feet and provided with heat exchange surface. 12 pounds of technical grade $KMnO_4$ dissolved in 120 pounds of water was also charged to the reactor to give a catalyst concentration of 0.4 weight percent $KMnO_4$, basis the wax charged. The air was passed through the charge mixture at an air velocity of 4.2 feet per second, equivalent to about 12.5 cubic feet per pound per hour, and the temperature of the charge raised to about 350° F. by indirect heat exchange with steam. At this point, the reaction became rapid and steam to the heat exchange coils was shut off and water passed therethrough. The reaction was maintained at a temperature of 330° F. and atmospheric pressure for approximately 4 hours and 43 minutes. The resulting oxidate had the following properties:

| | |
|---|---|
| Neut. no. | 85 |
| Sap. no. | 235 |
| Ratio, neut. no./sap. no. | 0.36 |
| Unsap., percent | 33 |
| Visc., Say. Univ., at 210° F. | 100 |
| Naphtha insoluble, percent | 5 |
| Yield, percent | 70 |

The yield figure in the above tabulation refers to the amount of oxidate remaining in the reactor after completion of oxidation. An appreciable amount of light oxidate, about 17 weight percent basis charge, is distilled overhead during the reaction.

The average properties of the oxidates obtained on 19 plant runs at the afore-described conditions were as follows:

| | |
|---|---|
| Neut. no. | 84 |
| Sap. no. | 218 |
| Ratio, neut. no./sap. no. | 0.38 |
| Unsap., percent | 33.5 |

While all of the foregoing examples have utilized semi-refined paraffin wax obtained from a paraffin distillate of SAE Grade 20 in order to spotlight the critical nature of the prescribed operating conditions, the process is also applicable to other deoiled macrocrystalline paraffin waxes containing less than 5 percent oil such as crude scale waxes. The important factor in selection of the charge wax is that it be macrocrystalline in character, derived from a paraffin base distillate oil and have an oil content less than 5 percent and preferably less than 3 percent.

*Example V*

In the following pilot plant scale runs the reactor used was the same as the one described in Example I, above; the deoiled paraffin wax, obtained from a distillate lubricating oil, had the following properties:

| | |
|---|---|
| Gravity, ° API | 43.7 |
| Flash, C.O.C., °F. | 410 |
| Fire, O.C., °F. | 470 |
| Viscosity, S.U.S., 210° F. | 38.3 |
| Ash, percent | 0 |
| Sulfur, percent | 0.09 |
| Oil, percent (ASTM) | 0.25 |

The wax charge, weighing 150 pounds and having no extraneous material added, was heated rapidly to a booster temperature of about 350° F., then was maintained at a temperature of about 330° F. and atmospheric pressure while air was blown therethrough at a superficial velocity of 3.3 feet per second, using an air rate of 20 cubic feet of air per pound of paraffin wax per hour. The results from a series of four runs was as follows:

| Batch No. | 1 | 2 | 3 | 4 |
|---|---|---|---|---|
| Reaction Time, Hours | 2.75 | 2.75 | 2.67 | 2.67 |
| Yield, percent, based on weight of charge | 89 | 87 | 89 | 90 |
| Product Properties: | | | | |
| Neut. No. | 86 | 81 | 81 | 82 |
| Sap. No. | 181 | 217 | 175 | 180 |
| Unsaponifiable, Percent | 26 | 26 | 28 | 17 |
| Gravity, ° API | 17.2 | 17.2 | 17.8 | 17.9 |
| Viscosity, SUS, 210° F. | 75 | 73.5 | 75 | 73.8 |
| Hydrocarbon Solubility, Percent [1] | 85 | 85 | 88 | 85 |

[1] Two parts by weight of hydrocarbon distillate, in this case a distillate from naphthene base crude mineral oil, said distillate having API gravity in the range of 28 to 31° and minimum flash point (T.C.C.) of 150° F., and one part of the oxidate product are mixed and stirred with warming, if desired, then allowed to stand for 24 hours at room temperature. The percentage solubility is determined by the expression 100 (original volume of oxidate-volume of settled insoluble portion)/original volume of oxidate.

*Example VI*

In this series of operations the same reactor was used as was described in Example IV, above. The charge wax was the same kind as was used in Example V. Each charge weighed 3300 pounds, and no extraneous material was added to the charge. Air feed rate to the reaction was 50,000 standard cubic feet per hour, giving an air rate of 15.1 s.c.f.h. per pound of wax charged and superficial air velocity of about 5.5 feet per second. The charge was heated with steam coils to a booster temperature of 350° F., then maintained thereafter at about 320° F. as the oxidation reaction ensued, this temperature controlled by using cooling water in the coils. The table below describes the results:

| Batch No. | 1 | 2 |
|---|---|---|
| Reaction Time, Hours | 2.92 | 3 |
| Yield, percent, based on weight of charge | 82.7 | 88.9 |
| Product characteristics: | | |
| Neut. No. | 90 | 94 |
| Sap. No. | 195 | 200 |
| Unsaponifiable, Percent | 33.4 | 31.3 |
| Iodine Value | 10 | 9 |
| Gravity, ° API | 21.1 | 19.8 |
| Viscosity, SUS, at 210° F. | 64.1 | 62.5 |
| Hydrocarbon Solubility, Percent [1] | 89.8 | 87.3 |

[1] Same basis as in Example V.

By way of comparison using the same conditions on the commercial plant scale reactor, except that 0.4% potassium permanganate catalyst was added based on the weight of the wax charge, it took 4½ hours oxidation time to reach a neut. number of 90, and the yield based on the weight of the wax charge was 68%. The product from this run was substantially the same as those from the foregoing two plant batches (where there was no added metalliferous catalyst) except that its iodine number was 3 rather than 9 or 10, and its hydrocarbon solubility was 97% rather than less than 90%.

From the foregoing it can be seen that substantial advantages can accrue when using our process either with the addition of metalliferous oxidation catalyst or in the absence of added catalyst, the catalytic operation giving a product of significantly greater hydrocarbon oil solubility than the non-catalytic operation, but requiring substantially longer oxidation time and yielding less product.

Both of our novel oxidate products, when blended with a hydrocarbon such as a lubricating oil base stock, motor naphtha stock or a gas oil at the dosage of 18 pounds per thousand barrels give a mixture which is virtually non-corrosive to steel as measured, for example, by the following test made at 90° F.: a polished steel strip is allowed to stand for 15 minutes in a 4-ounce bottle containing 110 cc. of the hydrocarbon oil-wax oxidate blend.

Then 20 cc. of water are added to the bottle, and the mixture is shaken for 15 seconds in a horizontal position. The bottle is then turned upright and given a short swirl to sweep the larger water droplets from the strip. Inspection of the portion of steel strip immersed in the oil phase is made at 3 and 24 hours to check for visible evidence of rust.

We claim:

1. A process for producing a wax oxidate characterized by a neut. number of 70–100, a sap. number above 170, a sap. number to neut. number ratio of between 0.25 and 0.5, and an unsaponifiable content less than about 40% which comprises reacting, for about 1–10 hours, a deoiled macrocrystalline paraffin wax of 20 to 33 carbon atoms, said wax containing less than 5% oil and isolated from a distillate lubricating oil, with air at an air velocity of 1.5 to 6 feet per second and at an air rate in the range of 4 to 38 cubic feet per hour per pound of wax, at a temperature between 300° and 350° F., and at a pressure less than 25 p.s.i.a.

2. The process of claim 1 in which the oxidation is performed in the absence of added metalliferous oxidation catalyst, and the time used is between about 1 and about 4 hours.

3. A process for producing a wax oxidate characterized by high solubility in hydrocarbons, a neut. number of 70–100, a sap. number above 200, a neut. number to sap. number ratio between 0.25 and 0.5, and an unsaponifiable content less than about 40% which comprises reacting, for about 4–10 hours in the presence of a metalliferous oxidation catalyst, a deoiled macrocrystalline paraffin wax of 20 to 33 carbon atoms, said wax containing less than 5% oil and isolated from a distillate lubricating oil, with air at an air velocity of 1.5 to 6 feet per second and at an air rate in the range of 4 to 38 cubic feet per hour per pound of wax, at a temperature between 300° and 350° F., and at a pressure less than 25 p.s.i.a.

4. The process according to claim 3 in which the pressure is substantially atmospheric, the air velocity is 2–5 feet per second, the temperature is between 330° and 340° F. and the paraffin wax contains 25 to 30 carbon atoms and is obtained by solvent dewaxing a distillate lubricating oil fraction.

5. A wax oxidate, the product of oxidizing macrocrystalline paraffin wax of 20–33 carbon atoms and less than 5% oil content with air for about 1–10 hours at a temperature of 300–350° F., a pressure less than 25 p.s.i.a., using an air velocity of 1.5 to 6 feet per second, and an air rate in the range of 4 to 38 cubic feet per hour per pound of wax, said oxidate being characterized by the following properties: Neut. number between 70 and 100; sap. number between 170 and 300; neut. number to sap. number ratio of 0.25–0.5; viscosity below about 900 SUS at 210° F.; and unsaponifiable content less than 40%.

6. The wax oxidate as defined in claim 5 wherein the oxidation is performed in the absence of added metalliferous oxidation catalyst, and the time used is between about 1 and about 4 hours.

7. A wax oxidate, the product of oxidizing macrocrystalline paraffin wax of 20–33 carbon atoms and less than 5% oil content with air for about 4–10 hours in the presence of a metalliferous oxidation catalyst and at a temperature of 300–350° F., a pressure less than 25 p.s.i.a., using an air velocity of 1.5 to 6 feet per second, and an air rate in the range of 4 to 38 cubic feet per hour per pound of wax, said oxidate having good oil solubility and being characterized by the following properties: Neut. number between 70 and 100; sap. number between 210 and 300; neut. number to sap. number ratio between 0.25 and 0.4; viscosity below about 900 S.U.S. at 210° F., and unsaponifiable content less than 40 percent.

References Cited in the file of this patent

UNITED STATES PATENTS

| | | |
|---|---|---|
| 2,216,222 | Beller | Oct. 1, 1940 |
| 2,486,454 | Zellner | Nov. 1, 1949 |
| 2,681,357 | McKinley et al. | June 15, 1954 |
| 2,705,241 | McKinley et al. | Mar. 29, 1955 |
| 2,818,419 | McKinley et al. | Dec. 31, 1957 |